(No Model.)
W. H. MURPHY.
SHAKER FOR MIXED BEVERAGES.
No. 271,350. Patented Jan. 30, 1883.
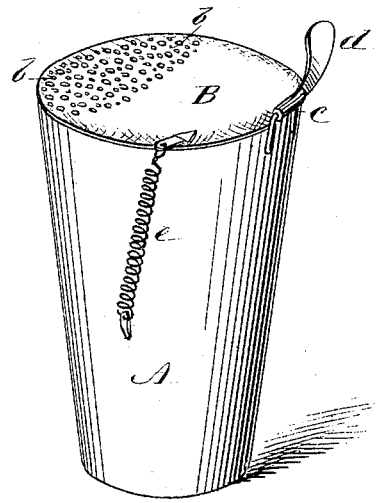
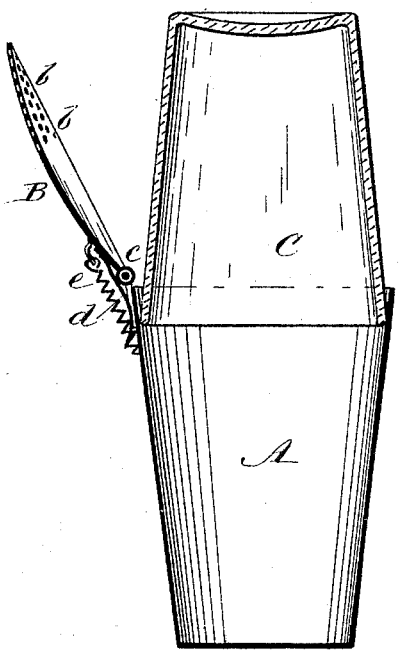
WITNESSES:
C. Naveux
B. G. Underwood.
INVENTOR:
W. H. Murphy.
BY Munn &Co
ATTORNEYS.

UNITED STATES PATENT OFFICE.

WILLIAM H. MURPHY, OF BRENHAM, TEXAS.

SHAKER FOR MIXED BEVERAGES.

SPECIFICATION forming part of Letters Patent No. 271,350, dated January 30, 1883.

Application filed November 21, 1882. (No model.)

*To all whom it may concern:*

Be it known that I, WILLIAM H. MURPHY, of Brenham, in the county of Washington and State of Texas, have invented a new and useful Improvement in Shakers for Mixed Beverages, of which the following is a full, clear, and exact description.

This invention relates to cups or utensils used in bar-rooms or elsewhere, and which are ordinarily termed "shakers," and are employed for mixing different liquids or liquors with different substances for making compound beverages that require to be strained before they are drunk. Ordinarily these shakers consist of a simple metal cup of tapering construction, and of a sufficient area on their upper end or mouth to receive within them the open end of a tumbler which contains the beverage to be mixed, so that after the tumbler has been inserted in the shaker, as described, the beverage or substances to be mixed may be violently shaken or tossed from one of said vessels to the other, and afterward be poured from the shaker through a strainer into the tumbler. Heretofore the strainer has been a separate device, which not only entails the expense of an additional utensil, but is inconvenient, as it may not always be within reach when needed.

Reference is to be had to the accompanying drawings, forming a part of this specification, in which similar letters of reference indicate corresponding parts in both the figures.

Figure 1 represents a view in perspective of a combined shaker and strainer embodying my invention, showing the straining-lid closed; and Fig. 2, a longitudinal section of the same with the lid open, and having a tumbler entered within it as when mixing beverages.

A in the drawings indicates the shaker or mixing-cup, which may be of the usual tapering construction, but which is provided at its open end with an attached lid, B, having perforations $b$ in it, or in a portion of its surface, whereby it is made to constitute a strainer. This lid is represented as attached to the cup or shaker by a hinge, $c$, and has a thumb-piece, $d$, at its hinge for opening it against the tension of a spring, $e$, which is shown as connecting the lid with the side of the shaker, and serves to keep the lid closed, and, furthermore, serves, when the lid is thrown up or back, to retain it in its open position by the crossing of the spring to the opposite side of the axis of the hinge, as shown in Fig. 2, or into intersecting position with it. Said spring, however, which is here represented as of spiral construction, but may be a straight one, may be otherwise arranged, if desired.

The shaker, with its attached straining-lid, may be used as an ordinary shaker when the lid is opened to admit the mouth end of a tumbler, C, within it, as shown in Fig. 2; but when said lid is closed the shaker then answers the purpose of a strainer for filtering the beverage as it is poured from it.

Having thus described my invention, I claim as new and desire to secure by Letters Patent—

The combination, with the cup A and hinged lid B, of the spring $d$, connecting the side of cup and top of lid to hold said lid either down or up, as described.

WILLIAM H. MURPHY.

Witnesses:
 M. M. BAIM,
 S. A. HOCKWORTH.